(12) United States Patent
Rivas Costante et al.

(10) Patent No.: US 10,708,407 B2
(45) Date of Patent: Jul. 7, 2020

(54) MOBILE DEVICE CASE EQUIPPED FOR SHORT-RANGE COMMUNICATION WITH A MOBILE DEVICE

(71) Applicant: Google LLC, Mountain View, CA (US)

(72) Inventors: Diego Rivas Costante, San Francisco, CA (US); Ozan Anac, Oakland, CA (US); Debanjan Mukherjee, San Jose, CA (US); Son Hoai Nguyen, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/261,825

(22) Filed: Jan. 30, 2019

(65) Prior Publication Data
US 2020/0186635 A1 Jun. 11, 2020

Related U.S. Application Data

(60) Provisional application No. 62/777,439, filed on Dec. 10, 2018.

(51) Int. Cl.
*H04M 1/725* (2006.01)
*H04B 5/00* (2006.01)

(52) U.S. Cl.
CPC ........ *H04M 1/7253* (2013.01); *H04B 5/0037* (2013.01); *H04B 5/0081* (2013.01)

(58) Field of Classification Search
CPC .. H04M 1/7253; H04B 5/0081; H04B 5/0037
USPC ...................................................... 455/41.1
See application file for complete search history.

(56) References Cited

U.S. PATENT DOCUMENTS

| 9,939,850 | B2 | 4/2018 | Hoellwarth et al. |
| 2008/0256642 | A1 | 10/2008 | Hachey |
| 2010/0225488 | A1* | 9/2010 | Hinterlong ......... G08B 21/0461 340/573.4 |
| 2013/0309966 | A1* | 11/2013 | Aldana ................. G06F 1/1613 455/41.1 |
| 2015/0249920 | A1 | 9/2015 | Lestario et al. |
| 2016/0057627 | A1 | 2/2016 | Burgbacher |
| 2017/0093463 | A1 | 3/2017 | Wang et al. |

FOREIGN PATENT DOCUMENTS

| EP | 2728510 | 5/2014 |
| KR | 20130017105 A | 2/2013 |

OTHER PUBLICATIONS

PCT International Search Report and Written Opinion in International Application No. PCT/US2019/048117, dated Nov. 15, 2019, 16 pages.

* cited by examiner

*Primary Examiner* — Eugene Yun
(74) *Attorney, Agent, or Firm* — Fish & Richardson P.C.

(57) ABSTRACT

A case for a mobile device that can include a piezoelectric component that is configured to output current in response to external pressure applied to the case, a switch between a near-field communication (NFC) antenna and an NFC circuit, and a controller that is configured to be powered by the current from the piezoelectric component to open the switch after an amount of time during which the switch is closed after the external pressure stops being applied to the case.

20 Claims, 3 Drawing Sheets

MOBILE DEVICE CASE EQUIPPED FOR SHORT-RANGE COMMUNICATION WITH A MOBILE DEVICE

CROSS-REFERENCE TO RELATED APPLICATION

This application claims the benefit of U.S. Provisional Application No. 62/777,439, filed Dec. 10, 2018, the contents of which are incorporated by reference herein.

TECHNICAL FIELD

This disclosure generally relates to mobile devices cases.

BACKGROUND

Mobile devices such as smartphones and tablets have become ubiquitous in modern society. People use such devices to perform various tasks, including communicating with other users verbally or through text based communications (e.g., with telephone calls, SMS messaging, email, or social media); accessing web pages; finding nearby attractions or places of interest; obtaining travel routes; and taking pictures and videos. In addition, mobile device accessories that are provided by mobile device manufacturers or third parties can provide additional functionality for mobile devices.

SUMMARY

This document describes techniques, methods, systems, and other mechanisms for providing short-range communication (SRC) between a mobile device case and a mobile device, and describes sensors, actions, and technologies that may be enabled with a corresponding infrastructure. SRC may include communication over a distance of approximately ten centimeters, thirty centimeters, one meter, or some other distance. SRC may include near-field communication (NFC). The SRC between the mobile device case and the mobile device may trigger the mobile device to perform an action. For example, the SRC may trigger the mobile device to activate a virtual assistant on the mobile device. Using SRC, e.g., NFC operating at 13.56 MHz, may avoid interference and high power consumption issues in Bluetooth low energy (BLE), which is commonly used in the wireless communication between wearable devices. Due to the widespread development of wearable technology, the 2.4 GHz Bluetooth frequency bands have become overcrowded. As a result, BLE communication may be frequently corrupted by interference. Additionally, high power consumption of BLE communication may require bulky batteries and therefore limit the size of wearable devices.

Using SRC may avoid problems with BLE communication. A case may use SRC for communication with a mobile device based on controlling when a passive SRC device in the case communicates with a SRC reader in the mobile device. For example, the SRC device may include a SRC antenna and a SRC circuit that may together communicate with the mobile device to trigger the mobile device to perform an action and otherwise not be in communication with the mobile device. Having the SRC device in the case otherwise not be in communication with the mobile device may ensure that the mobile device may communicate with other SRC devices and ensure that power is not unnecessarily expended on SRC signals between the SRC device and the mobile device.

In some implementations, the case may include a SRC antenna, a SRC circuit, and a switch that selectively couples the SRC antenna and the SRC circuit. For example, the SRC antenna may be a coil, the SRC circuit may be an integrated circuit, and the switch may be a mechanical button between the coil and the integrated circuit. The switch may be configured such that when pressed, the switch electrically couples the coil and the integrated circuit and, when released, electrically decouples the coil and the integrated circuit. When the SRC antenna and the SRC circuit are electrically coupled, the SRC circuit is able to transfer data to a SRC reader by load-modulating radio frequency fields generated by the SRC reader.

However, using a button to mechanically connect and disconnect a SRC antenna and SRC circuit may have a drawback in introducing latency. For example, a mobile device may scan for a SRC circuit for twenty milliseconds every five hundred milliseconds. Accordingly, if the button is quickly pressed and released within a four hundred eighty second period while the mobile device is not scanning, the button press may not be detected by the mobile device. This may lead to a user's uncomfortable feeling of pressing a button without a response from a mobile device or having to hold a button down until the mobile device detects the SRC circuit.

Accordingly, in some implementations, the case may include a controller that ensures that after a user applies external pressure, a switch is kept closed long enough such that the SRC circuit will have been read even if the external pressure was only applied when the mobile device was not scanning. The case may include a piezoelectric component that outputs current in response to the external pressure and the current may be used by the controller to keep the switch closed.

In some implementations, a radio-frequency energy harvester instead of a piezoelectric component may be used to power the switch controller. There may be two operation modes of the NFC reader in the phone: sleep mode and active mode. In sleep mode, the phone NFC reader may scan NFC tags every five hundred milliseconds. When the phone NFC reader detects a NFC tag close to it, the NFC reader may wake up and operate in active mode. In the active mode, the phone NFC reader may communicate with a NFC tag using a strong load-modulating radio frequency field. When the phone is in the sleep mode, the case with a radio-frequency (RF) energy harvester may momentarily get a small portion of the five hundred millisecond RF scanning power and store the power in an energy storage component. The stored energy may be used to power the controller to close the switch when a user applies external pressure.

In general, in one aspect, case for a mobile device includes a piezoelectric component that is configured to output current in response to external pressure applied to the case, a switch between a near field communication (NFC) antenna and an NFC circuit, and a controller that is configured to be powered by the current from the piezoelectric component to open the switch after an amount of time during which the switch is closed after the external pressure stops being applied to the case.

These and other embodiments can each optionally include one or more of the following features. In some aspects, the controller closes the switch in response to receiving the output current from the piezoelectric component. In certain aspects, the switch is mechanically biased to open and is closed by the external pressure and the controller keeps the switch closed for a remainder of the amount of time after the external pressure stops being applied to the case. In some implementations, the switch is configured such that when the switch is closed, the NFC antenna and the NFC circuit are electrically coupled and when the switch is open, the NFC antenna and the NFC circuit are not electrically coupled.

In certain aspects, the controller is configured to open the switch in response to passage of a constant predetermined amount of time. In some aspects, the controller includes a resistor-capacitor time constant circuit. In some implementations, the controller is configured to open the switch in response to a determination by the NFC circuit that information from the NFC circuit has been provided through the NFC antenna. In certain aspects, the controller is configured to open the switch in response to the NFC circuit receiving an instruction through the NFC antenna to open the switch. In some aspects, the piezoelectric component includes a thin film. In some implementations, the case includes an energy storage component that is configured to store at least a portion of the current from the piezoelectric component and output power to the controller.

In certain aspects, the case includes sensors that provide sensor data to the NFC circuit to provide through the NFC antenna. In some aspects, the case includes first and second opposing side walls for engaging respective edges of a mobile computing device. In some implementations, closure of the switch triggers a mobile computing device to call a virtual assistant.

Other embodiments of this aspect include a corresponding mobile device accessory.

In general, in another aspect, actions include outputting, by a piezoelectric component, a current in response to application of external pressure to a case, closing, by a controller that is powered by the current from the piezoelectric component, a switch between an NFC antenna and an NFC circuit for an amount of time after the external pressure has stopped being applied to the case, and opening, by the controller, the switch between the NFC antenna and the NFC circuit after the amount of time after the external pressure has stopped being applied to the case.

These and other embodiments can each optionally include one or more of the following features. In certain aspects, the controller closes the switch in response to receiving the output current from the piezoelectric component. In some aspects, the switch is mechanically biased to open and is closed by the external pressure and the controller keeps the switch closed for a remainder of the amount of time after the external pressure stops being applied to the case. In some implementations, the switch is configured such that when the switch is closed, the NFC antenna and the NFC circuit are electrically coupled and when the switch is open, the NFC antenna and the NFC circuit are not electrically coupled. In certain aspects, the controller is configured to open the switch in response to passage of a constant predetermined amount of time. In some aspects, the controller includes a resistor-capacitor time constant circuit.

Particular implementations can, in certain instances, realize one or more of the following advantages. A mobile device case can communicate with a mobile device without a direct, physical, electrical connection between the two. A user can provide input to a mobile computing device having a case without having to remove the case and without having to access input keys or buttons of the mobile computing device that protrude through apertures of the mobile device case. In other words, the user may contact or otherwise interact with the case to provide input to the mobile device. Selectively coupling the SRC circuit and SRC antenna may ensure that the SRC antenna in the case does not interfere with other SRC communications for the mobile device. For example, when the SRC circuit and SRC antenna are coupled to the mobile device, the SRC reader may not be able to read another SRC tag as the mobile device case is closer to the mobile device but once the SRC circuit is disconnected, the SRC antenna may not module SRC signals from the mobile device and the other SRC tag may communicate with the mobile device without significant interference from the SRC antenna of the case.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
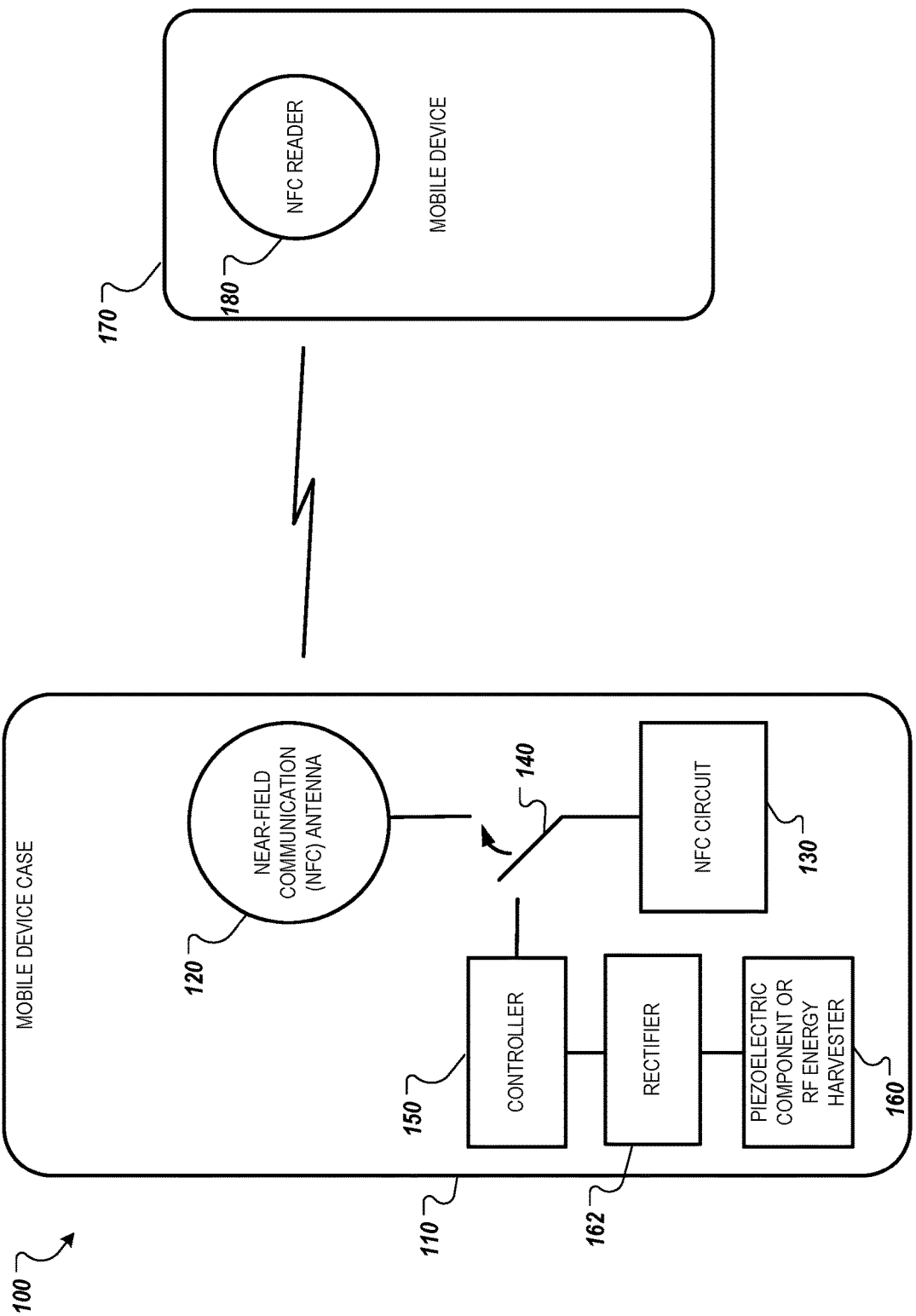
FIG. 1 shows a block diagram of an example of a system for providing short-range communication between a mobile device case and a mobile device.

FIG. 1 shows a block diagram of an example of a system 100 for providing short-range communication (SRC) between a mobile device case 110 and a mobile device 170. The system 100 includes the mobile device case 110 and the mobile device 170, where the mobile device case 110 includes an NFC antenna 120, an NFC circuit 130, a switch 140, a controller 150, a piezoelectric component or a RF energy harvester 160, and a rectifier 162. The mobile device 170 includes an NFC reader 180. While in this example the system 100 uses NFC, other types of SRC may be used. For example, the NFC antenna 120 may be an antenna for another type of SRC, the NFC circuit 130 may be a circuit for another type of SRC, the NFC reader 180 may be a reader for another type of SRC, etc.

The mobile device case 110 may be shaped to engage the mobile device 170 in a releasable fashion. For example, the mobile device 170 may be substantially rectangular and the mobile device case 110 may be similarly rectangular and made of material such that the mobile device case 110 may wrapped about the sides of the mobile device 170. The mobile device case 110 may include walls configured to engage sides of the mobile device 170 to secure the mobile device case 110 to the mobile device 170. In some embodiments, the mobile device case 110 may further include an upper wall and a lower wall for engaging upper and lower sides of the mobile device 170. For example, the mobile device case 110 may cover part of a front display and most of a back surface of the mobile device 170.

In some implementations, the walls may be partially or wholly constructed of an electrically inert material. The mobile device case 110 can constructed in whole or in part of a semi-elastic material to protect the mobile computing device from damage due to accidental shock (such as from dropping the mobile computing device). In some implementations, the mobile device case 110 is constructed in whole or in part of a shock absorbing material to protect the mobile device 170 from accidental shocks.

In some implementations, the mobile device case 110 includes a back that includes cutaway portions. The cutaway portions can, for example, allow one or more cameras of a mobile computing device or a logo of the mobile device 170 to be exposed. The back can be configured to engage and protect a back surface of a mobile device.

The NFC antenna 120 may be configured to receive radio frequency (RF) signals generated by the NFC reader 180 of the mobile device 170 and modulate the RF signals to transfer data from the NFC circuit 130 to the NFC reader 180. For example, the NFC antenna may be a coil made of conductive material.

The NFC circuit 130 may be configured to transfer data through the NFC antenna 120 to the NFC reader 180. For example, the NFC circuit 130 may be an integrated circuit that transfers data that indicates "Trigger" to the NFC reader 180 through the NFC antenna 120.

The switch 140 may be between the NFC antenna 120 and the NFC circuit 130. For example, the switch 140 may include one or more transistors that electrically couple the NFC antenna 120 and the NFC circuit 130 in response to voltage above a threshold on a gate terminal and electrically decouple the NFC antenna 120 and the NFC circuit 130 in response to no voltage above a threshold on the gate terminal.

The piezoelectric component 160 may be configured to output current in response to external pressure applied to the mobile device case 110. For example, the piezoelectric component 160 may output current in response to pressure being applied to both walls of the mobile device case 110 when the mobile device case 110 is squeezed by a user's hand. In some implementations, the piezoelectric component 160 may be a thin film embedded within the mobile device case 110 such that when external pressure is applied to the mobile device case 110 the film is deformed and generates current. In some implementations, the piezoelectric component 160 and other parts of the case 110 may be one or more of overmolded, laminated, or, adhered.

The piezoelectric component 160 can be composed of one or more materials, such as crystal, ceramic, or polymer materials, that, produce a measurable electric charge as mechanical forces are exerted upon them. The piezoelectric component 160 can be manufactured from one or more of the following materials: barium titanate, lead zierconate titanate (PZT), potassium niobate, sodium tungstate, Zinc oxide, sodium potassium niobate, bismuth ferrite, sodium niobate, bismuth titanate, sodium bismuth titanate, langasite, gallium orthophosphate, lithium niobate, lithium tantalate, and polyvinylidene fluoride.

In some embodiments, the piezoelectric component 160 is configured such that the strength of the electric charge produced by the piezoelectric component 160 increases proportionately with the mechanical stress imparted on the piezoelectric component 160. For example, a user can apply pressure to the mobile device case 110 to impart mechanical stress on the piezoelectric component 160. As the pressure imparted by the user increases, the voltage of the electric charge produced by the piezoelectric component 160 increases. In some implementations, the case 110 may enable the sensitivity of the pressure triggering an action to be adjusted based on the voltage produced by the piezoelectric component 160. For example, the controller 150 may compare a voltage threshold based on a sensitivity specified by a user to the voltage generated by the piezoelectric component 160 to determine whether to close the switch 140.

In some implementations, a diode bridge rectifier 162 may be used to convert alternating current (AC) output from the piezoelectric component into direct current (DC) power. For example, when using a radio-frequency harvester, a RF to DC rectifier may convert radio frequency, e.g., five hundred millisecond scanning signals, into a DC voltage.

The controller 150 may be configured to be powered by the current from the piezoelectric component 160 to open the switch 140 after an amount of time during which the switch 140 is closed after the external pressure stops being applied to the case 110. For example, the controller 150 may receive power from the piezoelectric component 160, and, using the received power, output a voltage for five hundred milliseconds to a gate terminal of the switch 140 such that the switch 140 is closed for at least five hundred milliseconds. Keeping the switch 140 closed for at least five hundred milliseconds may ensure that the NFC reader 180 will have scanned at least once while the switch 140 was closed.

In some implementations, the controller 150 closes the switch 140 in response to receiving the output current from the piezoelectric component 160. For example, the controller 150 receives power from the piezoelectric component 160 in response to the mobile device case 110 being squeezed and, in response, the controller 150 outputs the power from the piezoelectric component 160 to the gateway terminal of the switch 140 so that the switch 140 closes.

In some implementations, the controller 150 is configured to open the switch in response to passage of a constant predetermined amount of time. For example, the controller 150 may open the switch three hundred, five hundred milliseconds, six hundred milliseconds, or some other constant amount of time after the external pressure is first applied to the case 110. The predetermined amount of time may be equivalent to the period that the NFC reader 180 scans for an NFC circuit. In some implementations, the controller 150 may be a resistor-capacitor time constant circuit. For example, the resistor-capacitor time constant circuit may be configured to indicate when five hundred milliseconds have passed.

In some implementations, the controller 150 is configured to open the switch in response to a determination by the NFC circuit 130 that information from the NFC circuit 130 has been provided through the NFC antenna 120. For example, the NFC circuit 130 may detect when information is transmitted through the NFC antenna 120 and, in response, provide an instruction to the controller 150 to open the switch 140. The NFC circuit 130 may detect when information is transmitted through the NFC antenna 120 based on determining that RF signals may been modulated by the NFC circuit 130.

In some implementations, the controller 150 is configured to open the switch 140 in response to the NFC circuit 130 receiving an instruction through the NFC antenna 120 to open the switch 140. For example, the NFC circuit 130 may receive, through the NFC antenna 120, an instruction from the NFC reader 180 to cease NFC communication. The controller 150 may keep the switch 140 closed until the instruction is received by the NFC circuit 130.

In some implementations, the mobile device case 110 may include an energy storage component that is configured to store at least a portion of the current from the piezoelectric component 160 and output power to the controller 150.

In some implementations, the mobile device case 110 may include RF energy harvesting circuits that harvest power from RF signals from the mobile device 170 in the NFC active mode and store the power in the energy storage component. For example, the RF energy harvesting circuits may receive NFC signals from the NFC reader 180, generate power from the NFC signals, and provide the power to the energy storage component. For example, the case 110 may include a super capacitor or rechargeable battery that receives power from NFC signals, stores that power, and provides that power from storage to the controller 150.

The energy storage component may provide the power to the NFC circuit 130 or other components. For example, the mobile device case 110 may include air quality sensors, humidity sensors, ultraviolet light sensors, gas sensors, or other types of sensors that are powered through the energy storage component. In the example of other sensors, sensor data from the sensors may be received by the NFC circuit 130 and provided to the mobile device 170 through the NFC antenna 120. In some implementations, the mobile device case 110 may detect when power stored by the energy storage component is low and in response, instruct the controller 150 to close the switch 140 and the NFC circuit 130 to transmit an instruction to the NFC reader 180 through the NFC antenna 120 where the instruction causes the mobile device 170 to transmit RF signals from which the RF energy harvesting circuits can generate power.

In implementations with RF energy harvesting, the switch 140 may be mechanically biased to open and may be closed by external pressure and the controller 150 may keep the switch 140 closed for a remainder of the amount of time after the external pressure stops being applied to the case 110. For example, the switch 140 may be a mechanical switch that is spring-loaded to disconnect the NFC antenna 120 from the NFC circuit 130 while no external pressure is being applied to the switch 140 and the controller 150 may control an actuator to apply external pressure to the switch 140 to keep the switch 140 closed for the remainder of the amount of time after the external pressure stops being applied to the case 110.

In some implementations, the components of the mobile device case 110 may instead be incorporated into a mobile device accessory. For example, a mobile device accessory may include the NFC antenna 120, the NFC circuit 130, the switch 140, the controller 150, and the piezoelectric component 160 but not have walls that engage sides of the mobile device 170 and instead have an adhesive that enables the accessory to be affixed to a back side of the mobile device 170. A mobile device accessory may be a physical object that is attachable to the mobile device 170 but not incorporated into the mobile device 170.

Figure 2:
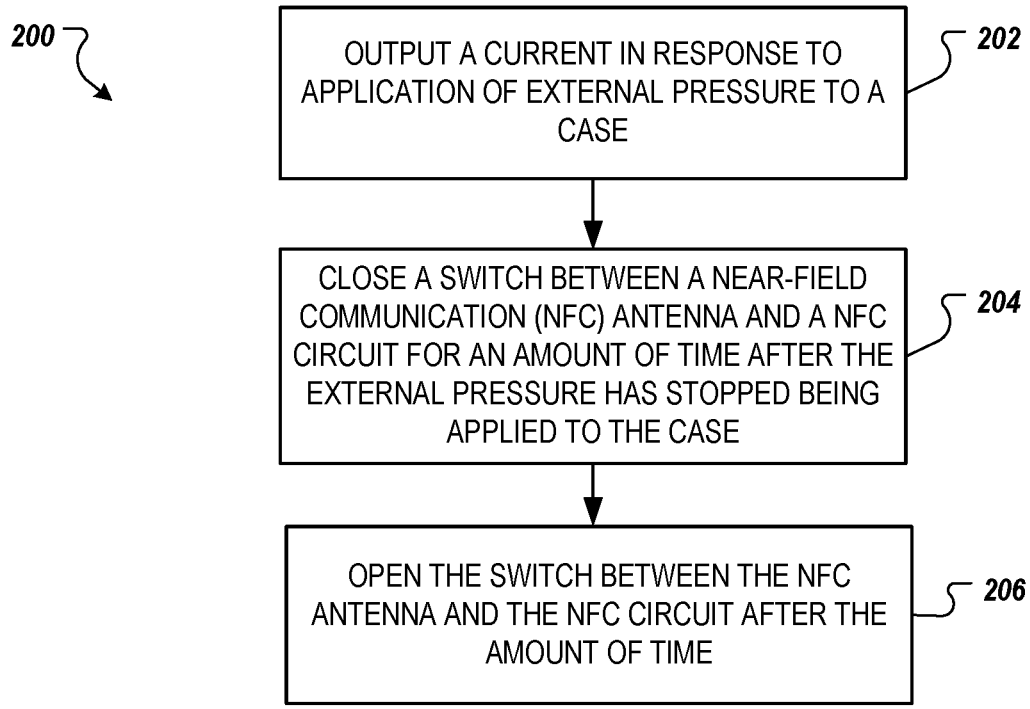
FIG. 2 is a flow chart of an example process for providing short-range communication between a mobile device case and a mobile device.

FIG. 2 is a flow chart of an example process 200 for providing short-range communication between a mobile device case and a mobile device. The process 200 is described with examples based on system 100 of FIG. 1. However, the operations of the process 200 may be performed by other systems.

The process 200 includes outputting a current in response to application of external pressure to a case (202). For example, the piezoelectric component 160 of the case 110 may generate a current in response to the case 110 being squeezed by a hand of a user.

The process 200 includes closing a switch between an NFC antenna and an NFC circuit for an amount of time after the external pressure has stopped being applied to the case (204). For example, the controller 150 that is powered by the current from the piezoelectric component 160 may close the switch 140 between the NFC antenna 120 and the NFC circuit 130 for an amount of time after the external pressure has stopped being applied to the case 110 such that the total amount of time the switch 140 is closed is five hundred milliseconds. In another example, the controller 150 that is powered by the current from the piezoelectric component 160 may close the switch 140 between the NFC antenna 120 and the NFC circuit 130 until the NFC circuit 130 detects that information is read through the NFC antenna 120. In yet another example, the controller 150 that is powered by the current from the piezoelectric component 160 may close the switch 140 between the NFC antenna 120 and the NFC circuit 130 until the NFC circuit 130 receives, through the NFC antenna 120, and instruction to cease NFC communication with the NFC reader 180.

After the switch is closed, the process 200 includes opening the switch between the NFC antenna 120 and the NFC circuit 130 after the amount of time (206). For example, the controller 150 may open the switch 140 once five hundred milliseconds have passed since the external pressure was applied to the case. In another example, the controller 150 may open the switch 140 between the NFC antenna 120 and the NFC circuit 130 once the NFC circuit 130 detects that information is read through the NFC antenna 120. In yet another example, the controller 150 may open the switch 140 between the NFC antenna 120 and the NFC circuit 130 once the NFC circuit 130 receives, through the NFC antenna 120, and instruction to cease NFC communication with the NFC reader 180.

While example process 200 is described as using NFC, other types of SRC may be used. For example, a process may similarly include outputting a current in response to application of external pressure to a case, closing a switch between a SRC antenna and a SRC circuit for an amount of time after the external pressure has stopped being applied to the case, and opening the switch between the SRC antenna and the SRC circuit after the amount of time.

Figure 3:
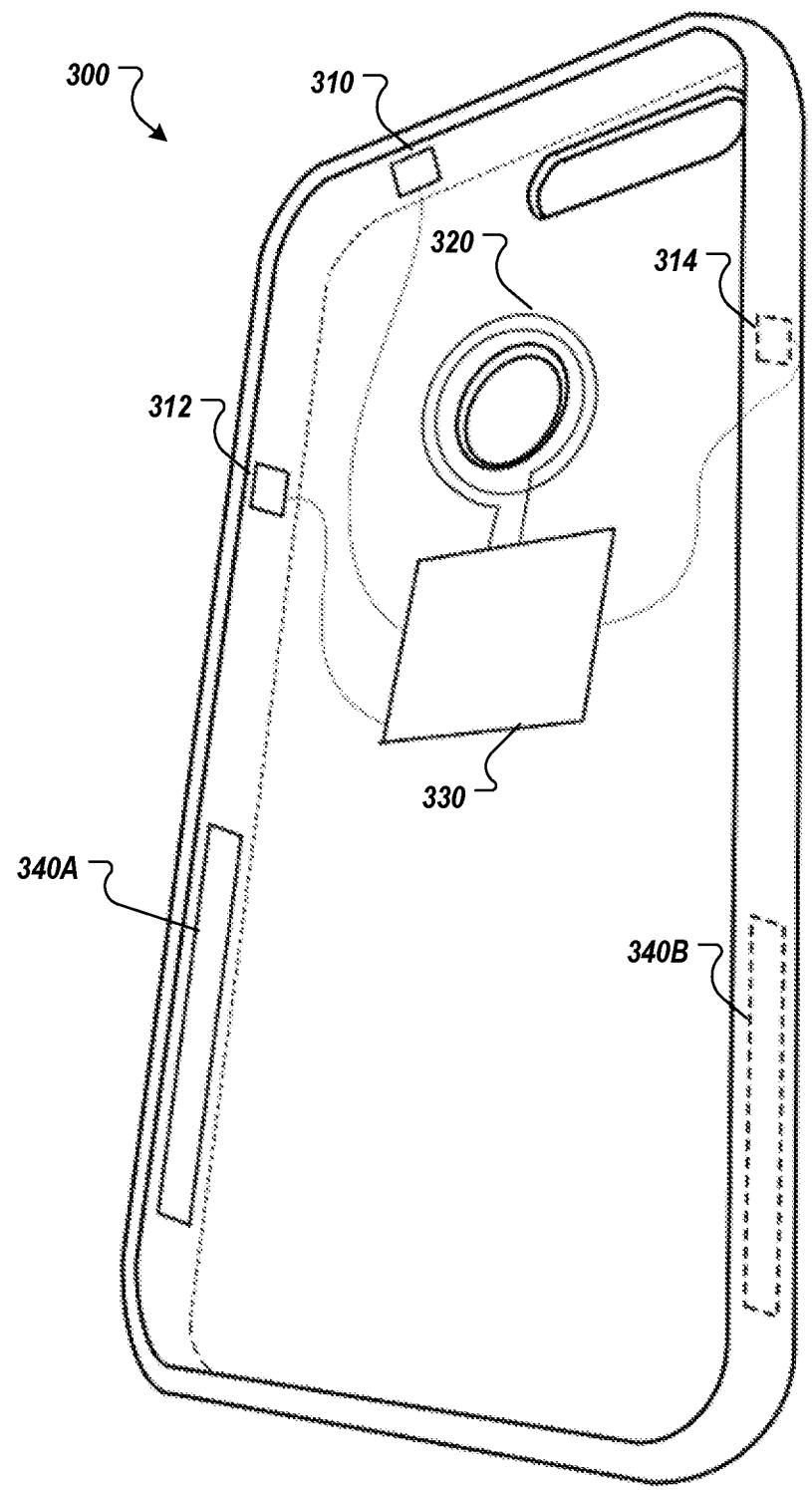
FIG. 3 shows a diagram of an example mobile device case for providing short-range communication with a mobile device.

FIG. 3 shows a diagram of an example mobile device case 300 for providing short-range communication with a mobile device. FIG. 3 illustrates an example of how a NFC inductive coil 320, a NFC circuit 330, a gas sensor 310, a humidity/temperature sensor 312, an ultraviolet sensor 314, and piezoelectric components 340A, 340B may be arranged in the case 300. However, the various components may be arranged in a different fashion. For example, the locations of the gas sensor 310 and the humidity/temperature sensors 312 may be reversed.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A case for a mobile device that comprises:
    a piezoelectric component that is configured to output current in response to external pressure applied to the case;
    a switch between a near field communication (NFC) antenna and an NFC circuit; and
    a controller that is configured to both:
        be entirely powered by the current output from the piezoelectric component; and
        control the switch (i) to stay closed during an amount of time after the external pressure stops being applied to the case and (ii) to open after the amount of time.

2. The case of claim 1, wherein the controller closes the switch in response to receiving the current output from the piezoelectric component.

3. The case of claim 1, wherein the switch is mechanically biased to open and is closed by the external pressure and the controller keeps the switch closed for a remainder of the amount of time after the external pressure stops being applied to the case.

4. The case of claim 1, wherein the switch is configured such that when the switch is closed, the NFC antenna and the NFC circuit are electrically coupled and when the switch is open, the NFC antenna and the NFC circuit are not electrically coupled.

5. The case of claim 1, wherein the controller is configured to open the switch in response to passage of a constant predetermined amount of time.

6. The case of claim 5, wherein the controller comprises a resistor-capacitor time constant circuit.

7. The case of claim 1, wherein the controller is configured to open the switch in response to a determination by the NFC circuit that information from the NFC circuit has been provided through the NFC antenna.

8. The case of claim 1, wherein the controller is configured to open the switch in response to the NFC circuit receiving an instruction through the NFC antenna to open the switch.

9. The case of claim 1, wherein the piezoelectric component comprises a thin film.

10. The case of claim 1, comprising an energy storage component that is configured to store at least a portion of the current from the piezoelectric component and output power to the controller.

11. The case of claim 1, comprising sensors that provide sensor data to the NFC circuit to provide through the NFC antenna.

12. The case of claim 1, comprising first and second opposing side walls for engaging respective edges of a mobile computing device,
wherein the piezoelectric component is located in one or more of the first or the second opposing side walls,
wherein the NFC circuit is located in a back of the case.

13. The case of claim 1, wherein closure of the switch triggers a mobile computing device to call a virtual assistant.

14. A method comprising:
outputting, by a piezoelectric component, a current in response to application of external pressure to a case;
controlling, by a controller that is entirely powered by the current output from the piezoelectric component, a switch between an NFC antenna and an NFC circuit to stay closed during for an amount of time after the external pressure stops being applied to the case; and
opening, by the controller, the switch between the NFC antenna and the NFC circuit after the amount of time after the external pressure stops being applied to the case.

15. The method of claim 14, wherein the controller closes the switch in response to receiving the current output from the piezoelectric component.

16. The method of claim 14, wherein the switch is mechanically biased to open and is closed by the external pressure and the controller keeps the switch closed for a remainder of the amount of time after the external pressure stops being applied to the case.

17. The method of claim 14, wherein the switch is configured such that when the switch is closed, the NFC antenna and the NFC circuit are electrically coupled and when the switch is open, the NFC antenna and the NFC circuit are not electrically coupled.

18. The method of claim 14, wherein the controller is configured to open the switch in response to passage of a constant predetermined amount of time.

19. The method of claim 18, wherein the controller comprises a resistor-capacitor time constant circuit.

20. A mobile device accessory that comprises:
a piezoelectric component that is configured to output current in response to external pressure applied to the case;
a switch between a near field communication (NFC) antenna and an NFC circuit; and
a controller that is configured to both:
be entirely powered by the current output from the piezoelectric component; and
control the switch (i) to stay closed during an amount of time after the external pressure stops being applied to the case and (ii) to open after the amount of time.

* * * * *